(12) United States Patent
Oates et al.

(10) Patent No.: US 6,391,105 B1
(45) Date of Patent: May 21, 2002

(54) ENHANCEMENT OF CEMENT CLINKER YIELD

(75) Inventors: David Bridson Oates, Kettleby; Kevin Moire Cail, Aurora; Paul Honore Lehoux, Kirkland; Robert Kim Ungar, Truro; Donald Stephen Hopkins, Thornhill; James Edward Cross, Truro; Michael Ritch, Richmond Hill, all of (CA)

(73) Assignee: Lafarge Canada Inc., Quebec (CA)

( * ) Notice: Subject to any disclaimer, the term of this patent is extended or adjusted under 35 U.S.C. 154(b) by 0 days.

(21) Appl. No.: 09/785,705

(22) Filed: Feb. 16, 2001

(51) Int. Cl.[7] .............................. C04B 7/12; C04B 7/48
(52) U.S. Cl. ...................... 106/705; 739/745; 739/750; 739/763; 739/DIG. 1
(58) Field of Search ................................. 106/739, 745, 106/748, 750, 763, 767, 705, DIG. 1

(56) References Cited

U.S. PATENT DOCUMENTS

| | | |
|---|---|---|
| 5,650,005 A | 7/1997 | Kistler |
| 5,837,052 A | 11/1998 | Oates et al. |
| 5,976,243 A | 11/1999 | Oates et al. |
| 6,146,133 A | * 11/2000 | Erhard et al. .................. 432/14 |

FOREIGN PATENT DOCUMENTS

| | | |
|---|---|---|
| DE | 26 24 971 | 6/1976 |
| DE | 26 24 971 | 12/1977 |
| WO | WO 96/26165 | 8/1996 |

* cited by examiner

*Primary Examiner*—Paul Marcantoni
(74) *Attorney, Agent, or Firm*—Bachman & LaPointe, P.C.

(57) ABSTRACT

The yield of cement clinker recovered from a kiln assembly is enhanced by feeding a particulate material comprising silica and an oxide of at least one of calcium and aluminum, for example, fly ash into contact with hot cement clinker; the fly ash melts to a partially fused material which chemically reacts with the hot clinker to produce a pyroprocessed cement clinker of crystalline hydraulic silicates; the extruder is added to the hot cement clinker downstream of the formation of the cement clinker, and suitably is added to the hot cement clinker at the upstream end of the cooler of the kiln assembly, or within the kiln, downstream of the burning zone, and more especially in the initial cooling zone at the discharge end of the kiln.

20 Claims, 1 Drawing Sheet

ENHANCEMENT OF CEMENT CLINKER YIELD

BACKGROUND OF THE INVENTION i) Field of the Invention

This invention relates to a process for enhancing the yield of cement clinker recovered from a cement kiln assembly.

ii) Description of Prior Art

In a cement plant, cement clinker is created at elevated temperatures in a cement kiln from cement clinker raw ingredients which travel through the kiln from a feed end to a discharge end, while passing through different processing zones at elevated temperature.

The resulting hot cement clinker which typically has a temperature of about 1400° C. on leaving the burning zone and at the discharge end of the kiln, is fed into a cooler, a system to cool the clinker and travels as a bed of clinker from the cooler entry port to the cooler exit port, for example, on a cooler grate. Here air is blown through the bed from jets disposed below the grate to cool the hot clinker. Depending on the cooler configuration the clinker at the cooler entry port has a temperature slightly below that of about 1400° C. and the clinker at the cooler exit port has a temperature of about 120° C.

The cooled cement clinker is ground to a desired fineness and is employed as such or in some cases it may be admixed with extenders, especially extenders having pozzolanic properties, to produce a blended cement. The extenders provide a saving in the cement clinker content of the product cement. The extenders are, in particular, by-products from industrial processes which by-products have a high content of silica and contain calcium and/or aluminium in an oxidized form, especially oxides or carbonates. Such extenders include coal ashes, more especially fly ashes and bottom ash; blast furnace slag and silica fume. In addition modifiers such as lime, cement kiln dust and waste cement or cement clinker could also be used to adjust chemistry or as a benefit to handling the extender where for example agglomeration is desired.

Since about 1986, the emphasis on controlling emission gases from power plants has resulted in the installation of low $NO_x$ burners as a means of reducing oxides of nitrogen in emission gases. The impact of these controls has been an increase in carbon content of Type F and to a lesser extent Type C pozzolanic flyash. Furthermore the addition of low levels of petroleum coke to lignite, bituminous and sub-bituminous coal at some plants has also increased the level of carbon in flyash.

Carbon such as contained in coal ash is a detrimental contaminant in cement, having the effect of absorbing chemicals with resulting deterioration of concrete performance.

Prior attempts to remove the carbon from the flyash include electrostatic separation; mixing the flyash with a fluid such as kerosene and separating the carbon out by foaming; and treating the flyash in a fluid bed combustion chamber for combustion of the carbon.

Bottom ash also contains carbon as a contaminant and it is preferable to remove the carbon if the bottom ash is to be incorporated in cement.

It has previously been proposed to add coal ash to cement clinker in the cooler of a cement kiln assembly in the production of blended cements (U.S. Pat. No. 5,837,052). In this prior proposal the integrity and identity of the coal ash is maintained and the contaminating carbon is oxidized by the heat of the hot clinker as it cools in the cooler to produce a blended mixture of cement clinker and coal ash free of carbon.

It has also been proposed in U.S. Pat. No. 5,976,243 to add blast furnace slag to the cement clinker in the cooler of a cement kiln assembly to drive off water in the slag and produce a blended mixture of cement clinker and blast furnace slag in which the integrity and identity of the blast furnace slag is maintained. In U.S. Pat. No. 5,650,005, it has been proposed to elevate the free lime content of a cement clinker by adding a source of free lime to the cement clinker

SUMMARY OF THE INVENTION

It is an object of this invention to provide a process for increasing or enhancing the yield of cement clinker recovered from a cement kiln assembly.

In accordance with the invention there is provided a process for enhancing the yield of a cement clinker recovered from a cement kiln assembly comprising a cement kiln for production of cement clinker and a cooler for cooling cement clinker from said kiln comprising:

a) producing hot cement clinker from cement clinker raw ingredients in a cement kiln;

b) feeding hot cement clinker from step a) into a cooler;

c) feeding a particulate material comprising silica and an oxide of at least one of calcium and aluminum into contact with said hot cement clinker downstream of the formation of said hot cement clinker and allowing said material to melt to a partially fused material, chemically reacting said partially fused material with the hot clinker to produce a pyroprocessed cement clinker composition of partially fused crystalline hydraulic silicates, cooling said cement clinker composition in said cooler; and d) recovering a cooled cement clinker composition from said cooler, said composition having a cement clinker content greater than that of the hot cement clinker in step b).

DESCRIPTION OF PREFERRED EMBODIMENTS

The process of the invention increases or enhances the yield of cement clinker recovered from the cooler of a cement kiln, without altering the chemistry, ingredients or process or operating parameters of the cement kiln.

This is a significant advantage since cement kiln operators are conservative by nature and demonstrate great reluctance to modify in any way the parameters of operation of a cement kiln which is operating satisfactorily.

i) The extenders employed in the invention are materials of high silica content and additionally contain calcium, aluminum or both in a form which will react with the silica at elevated temperatures in the cooler of a clinker kiln assembly, to form a composition consisting predominantly of crystalline, hydraulic calcium and aluminum silicates. The calcium and aluminum will typically be present as calcium oxide and aluminum oxide, respectively, but lesser amounts may be present as silicates, for example, calcium silicate and aluminum silicate, and aluminosilicates such as calcium aluminosilicate.

The extender may be amorphous or crystalline and typically will contain silica and calcium and/or aluminum compounds.

Suitable extenders chain silicate molecules which may be calcium or alumino silicates or both, typically containing the same silicates as cement clinker but with significantly less calcium, for example, coal ashes, blast furnace slag and silica fume, which are all by-products of industrial processing or manufacture. Modifiers could also be used to adjust chemistry or as a benefit to handling the extender where for example agglomeration is desired. These could include materials such as lime, cement kiln dust and cement.

At elevated temperatures downstream of the formation of the cement clinker in the kiln, under pyroprocessing conditions the particulate extenders melt to a partially fused state which chemically reacts with the hot cement clinker producing a cement clinker composition consisting predominantly of crystalline hydraulic calcium silicates and which composition is a pyroprocessed composition.

In a first embodiment the pyroprocessing reaction occurs in the upstream end of the cooler adjacent the exit of the cement clinker where the temperature is from 1400° C. to 1000° C.

In a second embodiment the pyroprocessing reaction may also take place in the cement kiln downstream of the zone of the kiln in which the cement clinker is formed and more especially within the kiln at the discharge end of the kiln; the discharge end of the kiln is an especially advantageous site for the addition of extenders in the form of coarse particles. The chemical reactions in the kiln which form the hot cement clinker product of the kiln, take place in the burning zone of the kiln and thus in this second embodiment the addition of the extender takes place downstream of the burning zone.

The particulate extender should have a particle size which permits a satisfactory level of partial fusion in the pyroprocessing, having regard to the point of addition of the extender to the hot cement clinker. In general at least 1%, by weight, more usually at least 50%, by weight, preferably at least 70%, by weight, and most preferably at least 90%, by weight, of the extender should partially fuse in the pyroprocessing.

It will be recognized that, in general, smaller particles will more readily partially fuse than larger particles at a given temperature and exposure time. However, larger particles having a porous honeycomb structure may partially fuse as readily as smaller particles.

The rate and degree of partial fusion of the particulate extender will depend on a number of factors including the physical form and size of the particles, the temperature of the hot cement clinker at the point of addition of the particulate extender, the exposure time of the particulate extender to the elevated temperature of the hot clinker, configuration of the kiln assembly and the exothermic heat energy such as derived from carbon burn out of carbon contaminated fly ash.

Typically fly ash has a particle size of less than 100 microns and can be employed in this form.

a) Coal Ash

Coal ash as employed in this invention refers to the residue produced in coal burning furnaces from burning pulverized anthracite or lignite, or bituminous or sub-bituminous coal. Such coal ash includes flyash which is the finely divided coal ash carried from the furnace by exhaust or flue gases; and bottom ash which collects at the base of the furnace as agglomerates.

The coal ash employed in the invention may be a Type F or Type C flyash and typically in the case of Type F will be contaminated with carbon; or bottom ash similarly contaminated with carbon, such as results from the employment of low $NO_x$ burners to reduce oxides of nitrogen in coal burning power plants, or from uneven firing of coal fired burners generally; or from the addition of low levels of petroleum coke to lignite and sub-bituminous and bituminous coal.

The Type F and Type C flyashes referred to above are defined by CSA Standard A23.5 and ASTM C618, both incorporated herein by reference.

Class C fly ash typically has an analytical content of CaO greater than 8%, by weight, and generally greater than 20%, by weight. An analytical content of CaO refers to the total content of Ca expressed as the oxide CaO, the analytical content of CaO may include free lime, i.e., free CaO and CaO present in a chemical combined state, for example, in calcium silicates and calcium aluminates, crystalline melilite ($Ca_2Al_2SiO_8$) and merwinite ($Ca_3MgSi_2O_7$). The free lime content of Class C fly ash is typically less than 3%, by weight, of the analytical content.

The Type F flyash may contain 1 to 30% more usually 1 to 15%, and typically 1 to 10% by weight, of carbon. Type F flyash usually has an analytical content of CaO of less than 8% and typically less than 5%, by weight.

Typically a majority of the flyash, at least about 80%, by weight, comprises particles of less than 45 microns.

Bottom ash typically is recovered from the base of the furnace as granules of which 80%, by weight, have a size in the range of 100 microns to 8 cm. Bottom ash, being from the same coal source, will have a chemical composition similar to that of the finer flyash. The bottom ash is suitably ground or crushed to fine particle form before being added to the cement clinker in the cooler, but the particle size is not critical provided the desired partial fusing is achieved.

b) Slag

Blast furnace slag is a by-product from the production of iron in a blast furnace; silicon, calcium, aluminum, magnesium and oxygen are the major elemental components of the slag.

Blast furnace slags include air-cooled slag resulting from solidification of molten blast furnace slag under atmospheric conditions; granulated blast furnace slag, a glassy granular material formed when molten blast furnace slag is rapidly chilled as by immersion in water; and pelletized blast furnace slag produced by passing molten slag over a vibrating feed plate where it is expanded and cooled by water sprays, whence it passes onto a rotating drum from which it is dispatched into the air where it rapidly solidifies to spherical pellets.

Blast furnace slags typically contain 3 to 20%, generally 5 to 15%, by weight, of water within the voids between particles.

The invention extends to blast furnace slags generally including air-cooled blast furnace slags and water-cooled blast furnace slags.

The blast furnace slag may be, for example, granulated blast furnace slag or pelletized blast furnace slag. These slags have a glass content resulting from rapid quenching with water, which is typically above 90%, by weight, and have a water content of 3 to 20%, generally 5 to 15%, by weight. Pelletized blast furnace slag generally has a lower water content in the range of 5 to 10%, by weight.

Granulated blast furnace slag has a particle or granule size of up to 0.25 inches or up to 4.75 mm. Pelletized blast furnace slag has a pellet size up to 0.5 inches.

The analytical content of blast furnace slags in North America indicated, for analytical purposes as oxides, except for the sulphur content as set out in Table I below:

TABLE I

Chemical Constituent

| (as oxides) | Range of Composition in %, by weight |
|---|---|
| $SiO_2$ | 32–42 |
| $Al_2O_3$ | 7–16 |
| CaO | 32–45 |
| MgO | 5–15 |
| S | 0.7–2.2 |
| $Fe_2O_3$ | 1–1.5 |
| MnO | 0.2–1.0 |

Steel slag is a by-product from the production of steel and can be considered where it has similar chemistry to blast furnace slag; unacceptable levels of magnesium may restrict its use to low additions.

Non-ferrous slag by-products from the production of different non-ferrous metals from their ores can also be considered where they have a similar chemistry to blast furnace slag.

c) Silica Fume

Silica fume is a by product in the production of silicon or ferro-silicon alloys and is collected by filtration of gases escaping the electric-arc furnace. Typically it has a silicon dioxide content of at least 75%, by weight, and consists of fine, spherical particles having an average diameter of about 0.1 μm.

ii) Process

The process is described hereinafter by reference to the embodiment in which the extender is a coal ash, more particularly a flyash contaminated with carbon, but the invention applies similarly to fly ash not contaminated with carbon and to bottom ash contaminated or uncontaminated with carbon.

The flyash containing carbon is added to a travelling bed of hot cement clinker in the cooler, downstream of the cement kiln burning zone, at this stage the cement clinker is granular, typically composed of particles ranging up to 10 to 12 inches. The hot cement clinker travels along a path from the upstream end to the downstream end of the cooler.

The bed of cement clinker is typically 6 to 24 inches thick, travels at a velocity which varies depending on the cooler dimensions and the throughput of the kiln; typically the velocity is about 2 to 6 ft./min., and has a temperature which ranges from about 1400° C. at the entry port to the cooler, immediately downstream of the cement kiln burning zone, to 100° C.–1500° C., typically about 120° C. at the clinker discharge port of the cooler.

Generally, the clinker has a residence time of 15 to 60, more usually 20 to 40, and typically about 30 minutes in the cooler. The clinker in the clinker bed varies in size and may include agglomerates as large as 10 to 12 inches.

Jets of cooling air are directed through the travelling clinker bed, typically from below the bed. The large volume of cooling air fed into the cooler typically has two outflow paths from the cooler, one in a generally upstream direction from the cooler into the cement kiln where it provides secondary air for the thermal processes taking place in the cement kiln; and the other in a generally downstream direction and exiting through dust collectors at the downstream end of the cooler.

The hot clinker is thus exposed to cooling air in the path of travel of the bed so that the clinker is progressively cooled from about 1400° C. to about 150° C. as it travels from the upstream end to the downstream end.

The flyash is suitably introduced to the travelling bed of cement clinker so that all or a majority of the flyash travels with the cement clinker towards the exit port of the cooler. In addition the flyash is introduced to the travelling bed of clinker at a point such that the flyash has an adequate residence time in the cooler, at a sufficiently high temperature, suitably at least 1000° C. and typically 1000 to 1400° C. for combustion of the carbon content of the flyash and melting of the flyash to a partially fused material which chemically reacts with the hot clinker in the cooler to produce a partially fused pyroprocessed clinker and consisting primarily of hydraulic calcium silicates. Since the combustion of the carbon content is an exothermic reaction, the heat liberated during the combustion of the carbon helps the entire pyroprocessing of the cement kiln and also helps in promoting the pyroprocessing of the flyash to crystalline hydraulic silicates.

Various delivery means may be employed for introducing the flyash to the clinker, and the design and location of suitable delivery means in the cooler is well within the skill of persons in the art.

Tests carried out at a cement plant demonstrate that when adding finely divided F flyash as the extender the optimum pneumatic feeding point for the kiln and cooler configuration was in the first, most upstream, compartment of the cooler where the temperature was the highest. This was contrary to expectations that the close proximity of the kiln would allow the flyash to be swept from the cooler into the main body of the kiln by the air stream. The clinker surface was at a temperature sufficient to fuse and arrest the ash particle with the clinker.

For example a dry (or damp or moistened) flyash may be introduced by a reclaim screw auger, designed to give adequate dispersion in the cooler bed for enhanced commingling with the hot clinker. Introduction into the interior of the bed also minimizes possible loss of the flyash by entrainment in air flowing from the cooler, into the kiln.

For example, agglomerated flyash, bottom ash or slag because of the larger particle size could be fed into the clinker mass downstream from the burning zone as it travels from the kiln shell into the cooler to ensure good commingling. The extender, for example, flyash is suitably introduced to the clinker in the cooler in an amount to provide a content of extender, for example, flyash in the clinker of about 2 to 25%, preferably 5 to 15%, more likely 5 to 10% by weight, based on the combined weight of the extender and the clinker.

iii) Cement

The cement clinker recovered from the cooler is ground to a desired fineness of the cement clinker. Employing the process of the invention the flyash or other extender is integrated by the partial fusion pyroprocess into the cement clinker to enhance the yield of the cement clinker recovered from the kiln assembly.

DESCRIPTION OF PREFERRED EMBODIMENTS WITH REFERENCE TO THE DRAWINGS

Figure 1:
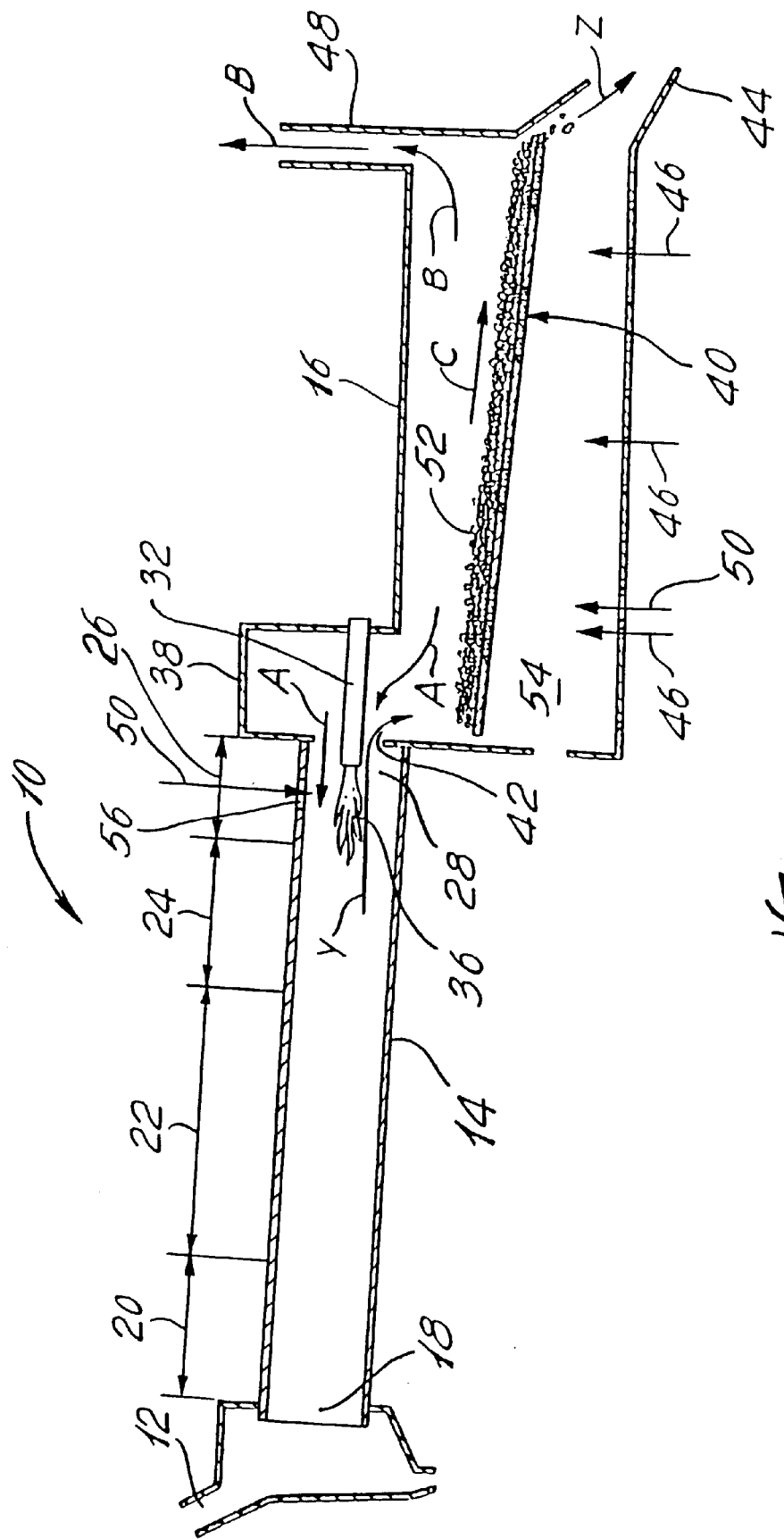
FIG. 1 is a schematic illustration of a kiln assembly including a kiln and a cooler.

With further reference to FIG. 1, a kiln assembly 10 includes a feed inlet 12, a rotary kiln 14 and a cooler 16.

The kiln 14 is mounted for rotation relative to feed inlet 12 and cooler 16. Rotary kiln 14 has a drying zone 20 for use in a wet process, a calcining zone 22, a burning zone 24 and an initial cooling zone 26 at the discharge end of kiln 14.

Rotary kiln 14 extends between a feed port 18 and a clinker outlet 28.

A burner assembly mounted externally of kiln 14 has a burner nozzle 32 mounted in a firing hood 38 which nozzle 32 extends through outlet 28 into kiln 14. A flame 36 is developed at nozzle 32.

Cooler 16 has an entry port 42 which communicates with clinker outlet 28 of kiln 14, and an exit port 44. A cooler grate 40 is mounted in cooler 16 and air jets 46 disposed below cooler grate 40 feed jets of cooling air upwardly through cooler grate 40 and a bed 52 of clinker supported on cooler grate 40. Assembly 10 has an air jet compartment 54 for feeding an extender, for example, flyash 50 contaminated with carbon pneumatically with an air jet 46 from below cooler grate 40 at an upstream end of cooler 16, and more especially through an upstream air compartment 54 of cooler 16.

Assembly 10 as illustrated also has an alternative port 56 for feeding the extender, for example, blast furnace slag into the kiln 14 downstream of the burning zone 24 and more especially at the discharge end of kiln 14 in initial cooling zone 26. Cooler 16 has an air discharge 48.

Cooler grate 40 comprises a plurality of plates in side-by-side relationship. Some of the plates have openings therethrough to allow passage of the cooling air. Some plates are fixed and other are mounted to oscillate, back and forth. The movement of the oscillating plates agitates the clinker, and with it the flyash. Air is fed through grate 40 by the air jets 46 which are in groups, each group being associated with an air jet compartment.

The cooler grate 40 is inclined downwardly from the entry port 42 to exit port 44. The bed 52 of clinker is advanced towards exit port 44 by the oscillation of some of the plates, in conjunction with the inclination and the build-up of clinker introduced into cooler 16 from kiln 14.

In operation raw cement clinker ingredients in particulate form are fed through inlet 12 and feed port 18 into kiln 14, where they first enter drying zone 20. The kiln 14 rotates slowly, and is inclined downwardly from port 18 to outlet 28. With the rotation of kiln 14, the ingredients advance slowly and sequentially through drying zone 20, calcining zone 22 and burning zone 24, into which a flame extends from burner nozzle 32. In drying zone 20 the temperature typically ranges from 300° C. to 800° C. In calcining zone 22 the temperature typically ranges from 825° C. to 1000° C. and in burning zone 24 the temperature is typically 1400° C. to 1425° C. Clinker formation is completed in burning zone 24.

The kiln 14 operates in conventional manner for cement clinker production and the present invention is not concerned with the operation of kiln 14 and does not modify in any way the operation of kiln 14 for cement clinker production. Hot clinker produced in kiln 14 is discharged through clinker outlet 28 and enters cooler 16 at entry port 42 where it falls onto the cooler grate 40 which advances the hot clinker towards exit port 44. The hot clinker falling onto cooler grate 40 forms a bed 52 of clinker particles which typically has a thickness or depth of 6 to 24 inches.

Air is injected under pressure through air jets 46 located below cooler grate 40, the air permeates through plates in the cooler grate 40 and the bed 52, the clinker being progressively cooled by the air from jets 46 as it advances towards exit port 44. The cooler 16 is typically operated under low pressure or partial vacuum and the air permeating upwardly through bed 52 flows either along the path indicated by the arrows A into kiln 14 or along the path indicated by the arrows B exiting from the downstream end of the cooler. The path of travel of the bed 52 is indicated by the arrow C.

Flyash contaminated with carbon if selected as the extender and maintained in its finely divided form is introduced to the clinker through the upstream first compartment 50 of air jets at an upstream end of cooler 16 where the temperature is sufficiently high for the pyroprocessing of the flyash. This represents merely one location where the flyash contaminated with carbon may be introduced. The flyash contaminated with carbon is introduced pneumatically from below the bed 52 through compartment 50 and so as to penetrate into the bed 52 with entrapment of the flyash within the bed 52.

As the bed 52 with the flyash contaminated with carbon travels towards exit port 44, the carbon content of the flyash is combusted to oxides of carbon with evolution of heat and with the heat of the hot cement clinker results in a clinker, partially fused by pyroprocessing, consisting predominantly of crystalline hydraulic calcium silicates. At the downstream end of cooler 16, the resulting cooled clinker and the flyash free of carbon fall from cooler grate 40 through exit port 44 and passes to further processing such as grinding for the manufacture of the cement.

Fine particles of flyash and/or cement clinker entrained in the air exiting discharge 48 along flow path B are collected and returned in the normal way currently used for clinker fines.

EXAMPLE

A trial was carried out at a Cement Plant to determine the effectiveness of adding a Class F flyash as an extender to cement clinker.

The flyash was introduced pneumatically to the kiln cooler through various compartments below the cooler grates.

Samples were recovered at 5 sampling points including the kiln hood, cooler discharge before the 2nd drag, after the 2nd drag, the gravel bed filter precleaning cyclone and the scavenging cyclone.

The flyash was introduced at 1.22 tonnes per hour with a kiln rate of 24.42 tonnes per hour.

In one of the tests the flyash was introduced through the upstream compartment by cooler fan #1.

Samples from the individual points showed that no flyash was evident in the kiln hood sample; 97% of all material was recovered before the 2nd drag; essentially no (0.1%) material was recovered in the scavenging cyclone; and 100% of the material was recovered after the 2nd drag. In all cases more than 90% of the flyash fused.

We claim:

1. A process for enhancing the yield of a cement clinker recovered from a cement kiln assembly comprising a cement kiln for production of cement clinker and a cooler for cooling cement clinker from said kiln comprising:
   a) producing hot cement clinker from cement clinker raw ingredients in a cement kiln;
   b) feeding hot cement clinker from step a) into a cooler;
   c) feeding a particulate material comprising silica and an oxide of at least one of calcium and aluminum into contact with said hot cement clinker downstream of the formation of said hot cement clinker and allowing said material to melt to a partially fused material, chemically reacting said partially fused material with the hot clinker to produce a pyroprocessed cement clinker composition of partially fused crystalline hydraulic silicates, cooling said cement clinker composition in said cooler; and d) recovering a cooled cement clinker composition from said cooler, said composition having a cement clinker content greater than that of the hot cement clinker in step b).

2. A process according to claim 1, wherein said material is a fly ash.

3. A process according to claim 2, wherein said fly ash is a Class C fly ash.

4. A process according to claim 2, wherein said fly ash is a Class F fly ash.

5. A process according to claim 1, wherein said particulate material in step c) is in an amount of 2 to 25%, by weight, based on the combined weight of hot cement clinker and particulate material.

6. A process according to claim 2, wherein said flyash in step c) is in an amount of 5 to 10%, by weight, based on the combined weight of hot cement clinker and fly ash.

7. A process according to claim 6, wherein said fly ash contacts said hot clinker at an upstream end of said cooler at a temperature of 1000 to 1400° C.

8. A process according to claim 1 wherein said material is bottom ash.

9. A process according to claim 1 wherein said material is blast furnace slag.

10. A process according to claim 1 wherein said material is steel slag.

11. A process according to claim 1 wherein said material is nonferrous slag.

12. A process according to claim 1 wherein said material is silica fume.

13. A process according to claim 1 wherein at least 1%, by weight, of said particulate material melts to form said partially fused material which reacts with said hot clinker.

14. A process according to claim 2 wherein at least 70%, by weight, of said particulate material melts to form said partially fused material which reacts with said hot clinker.

15. A process according to claim 4 wherein said flyash is contaminated with carbon and said carbon oxidises in an exothermic reaction and heat from said exothermic reaction contributes to melting of said particulate material to said partially fused material; and at least 90%, by weight, of said particulate material melts to form said partially fused material which reacts with said hot clinker.

16. A process according to claim 15 wherein said flyash in step c) is in an amount of 5 to 10%, by weight, based on the combined weight of hot cement clinker and particulate material.

17. A process according to claim 16 wherein said flyash contacts said hot clinker at a temperature of at least 1000° C. in step c).

18. A process according to claim 1 wherein said particulate material contacts said hot cement clinker at a temperature of at least 1000° C. in step c).

19. A process according to claim 1 wherein said particulate material contacts said hot cement clinker in the cement kiln downstream of formation of the cement clinker.

20. A process according to claim 1 wherein said particulate material is fed in c) in conjunction with an addition modifier to adjust chemistry or as a benefit for handling.

* * * * *